No. 872,821.

PATENTED DEC. 3, 1907.

J. H. JOHNSON.
CORN HARVESTING MACHINE.
APPLICATION FILED JAN. 22, 1906.

8 SHEETS—SHEET 1.

No. 872,821. PATENTED DEC. 3, 1907.
J. H. JOHNSON.
CORN HARVESTING MACHINE.
APPLICATION FILED JAN. 22, 1906.

8 SHEETS—SHEET 2.

Jesse H. Johnson, Inventor

Witnesses

By

Attorney

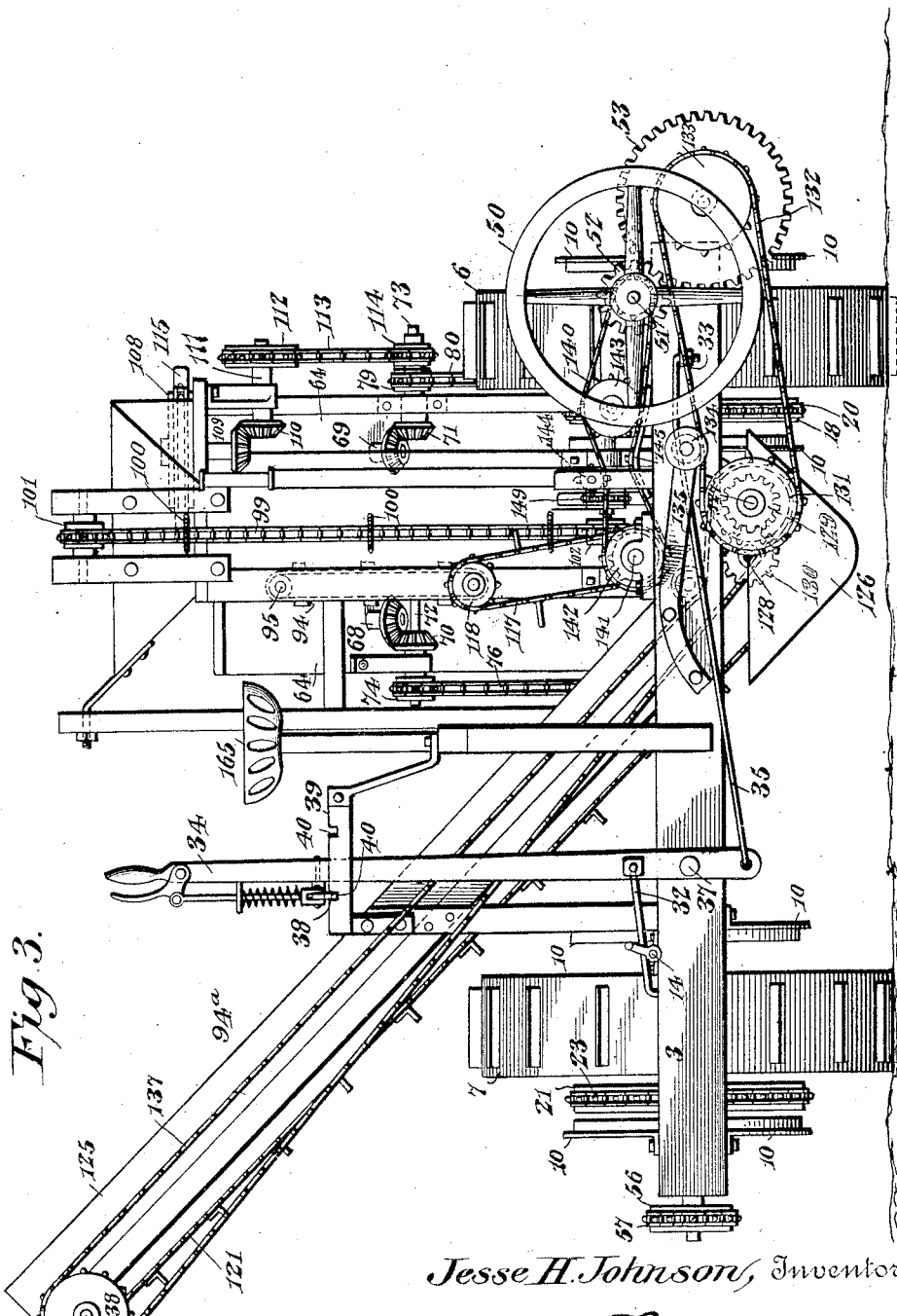

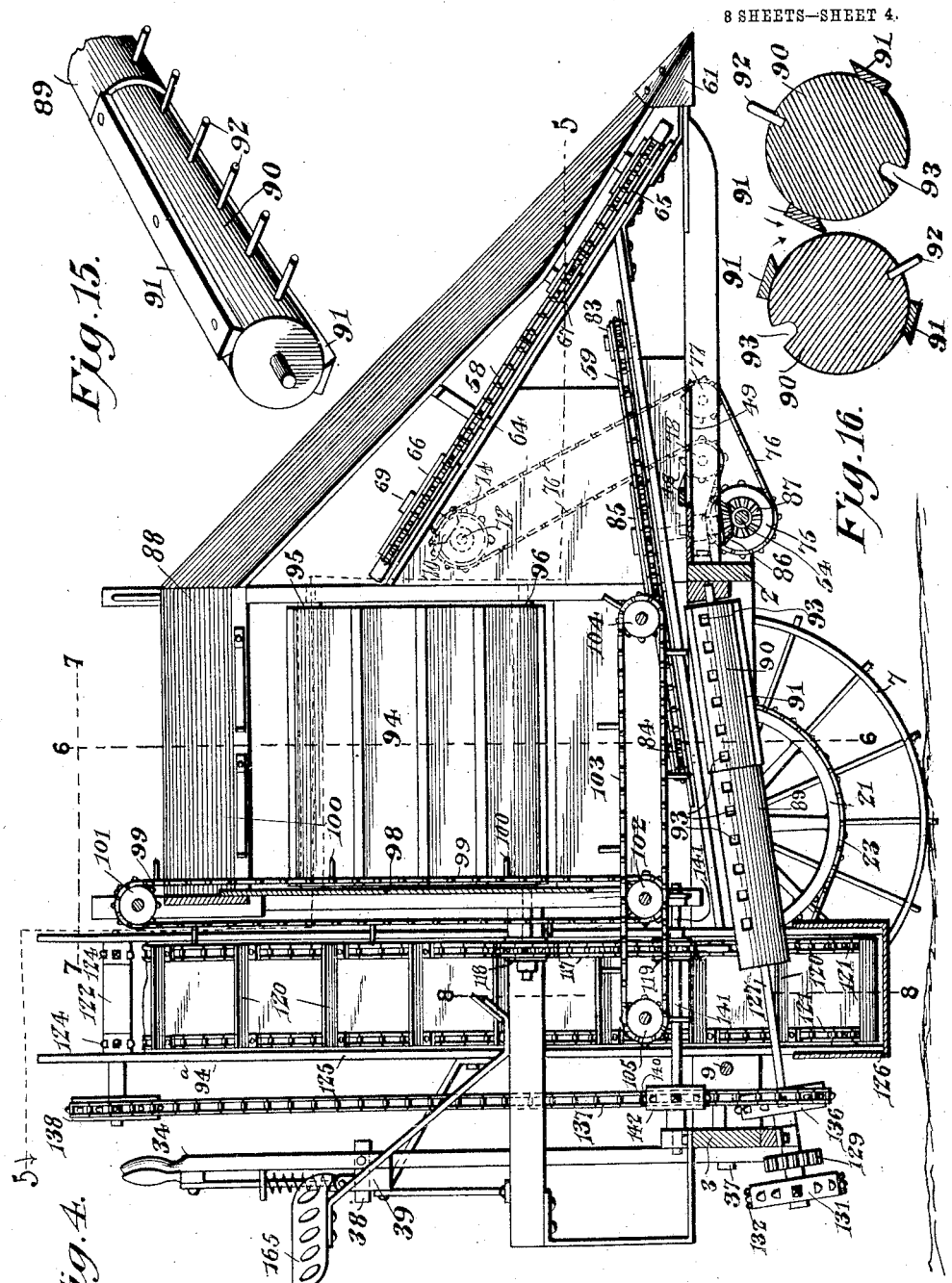

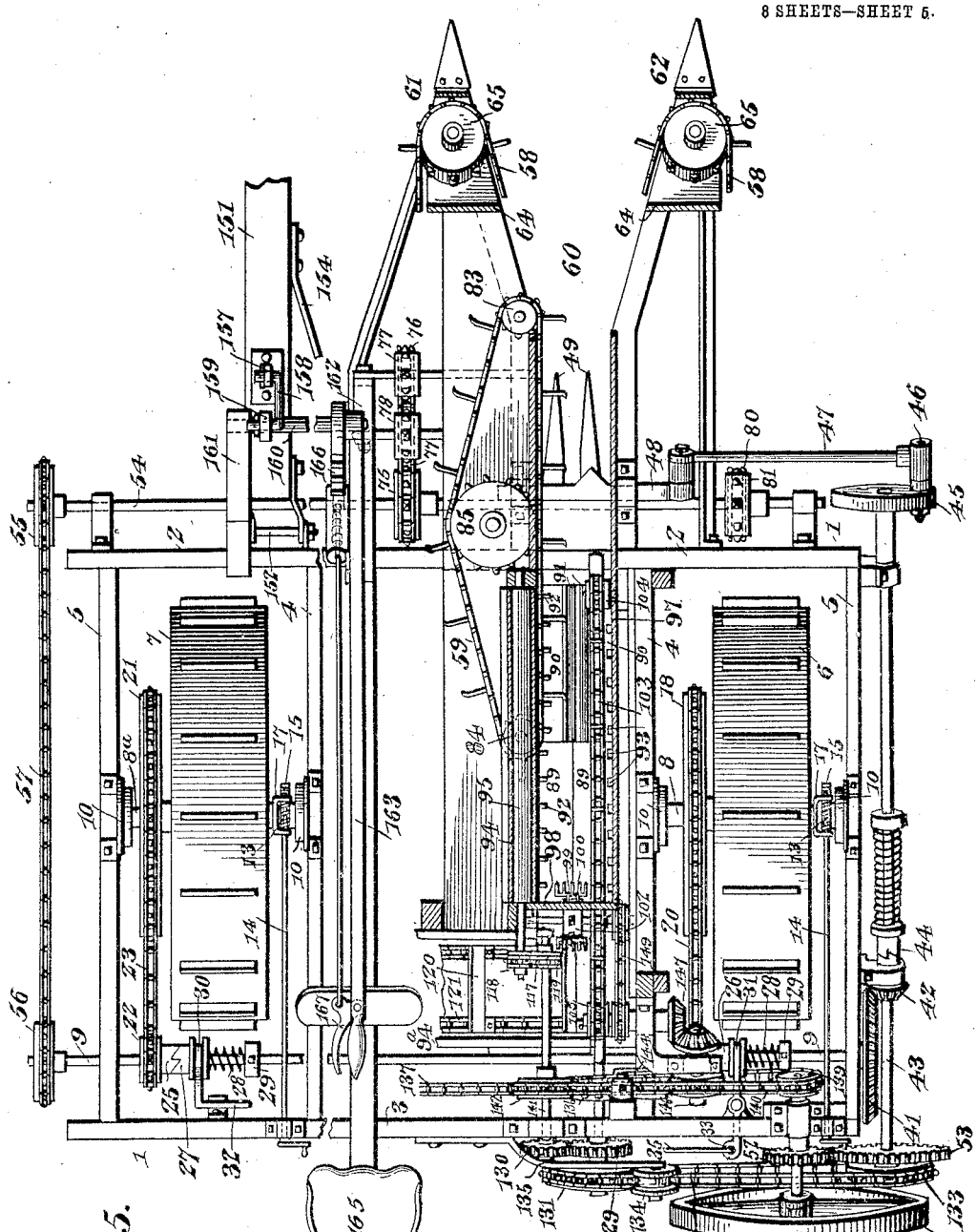

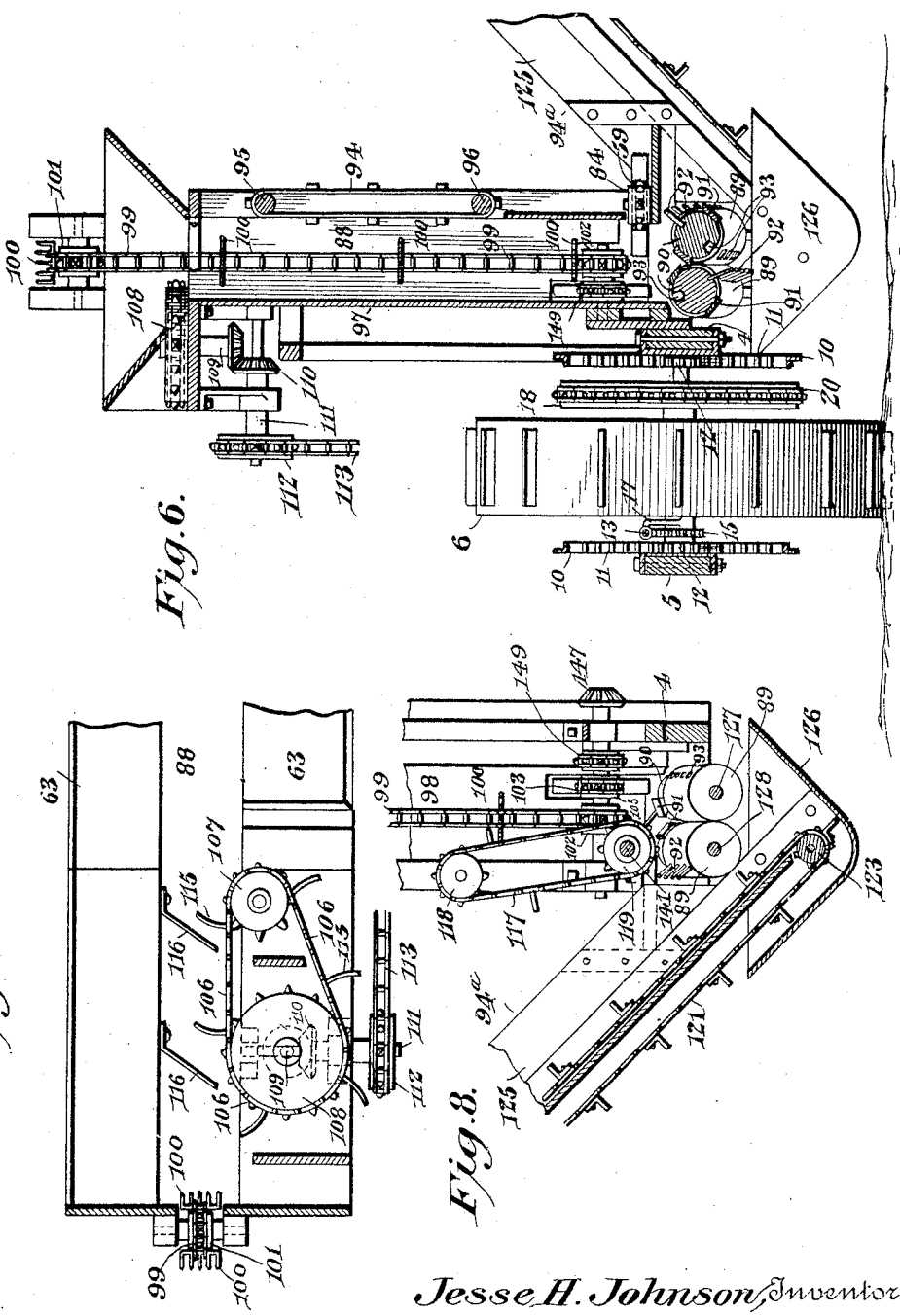

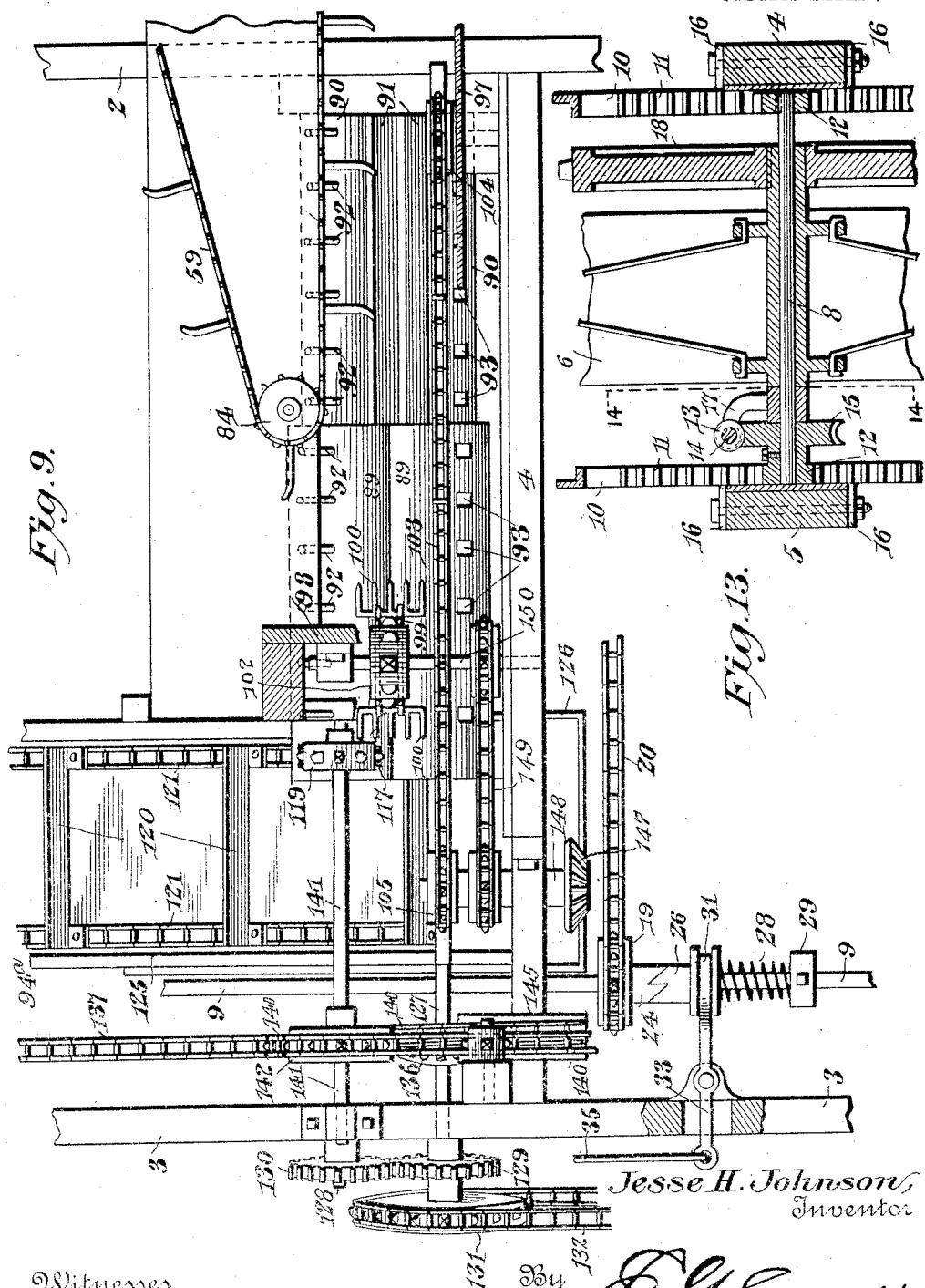

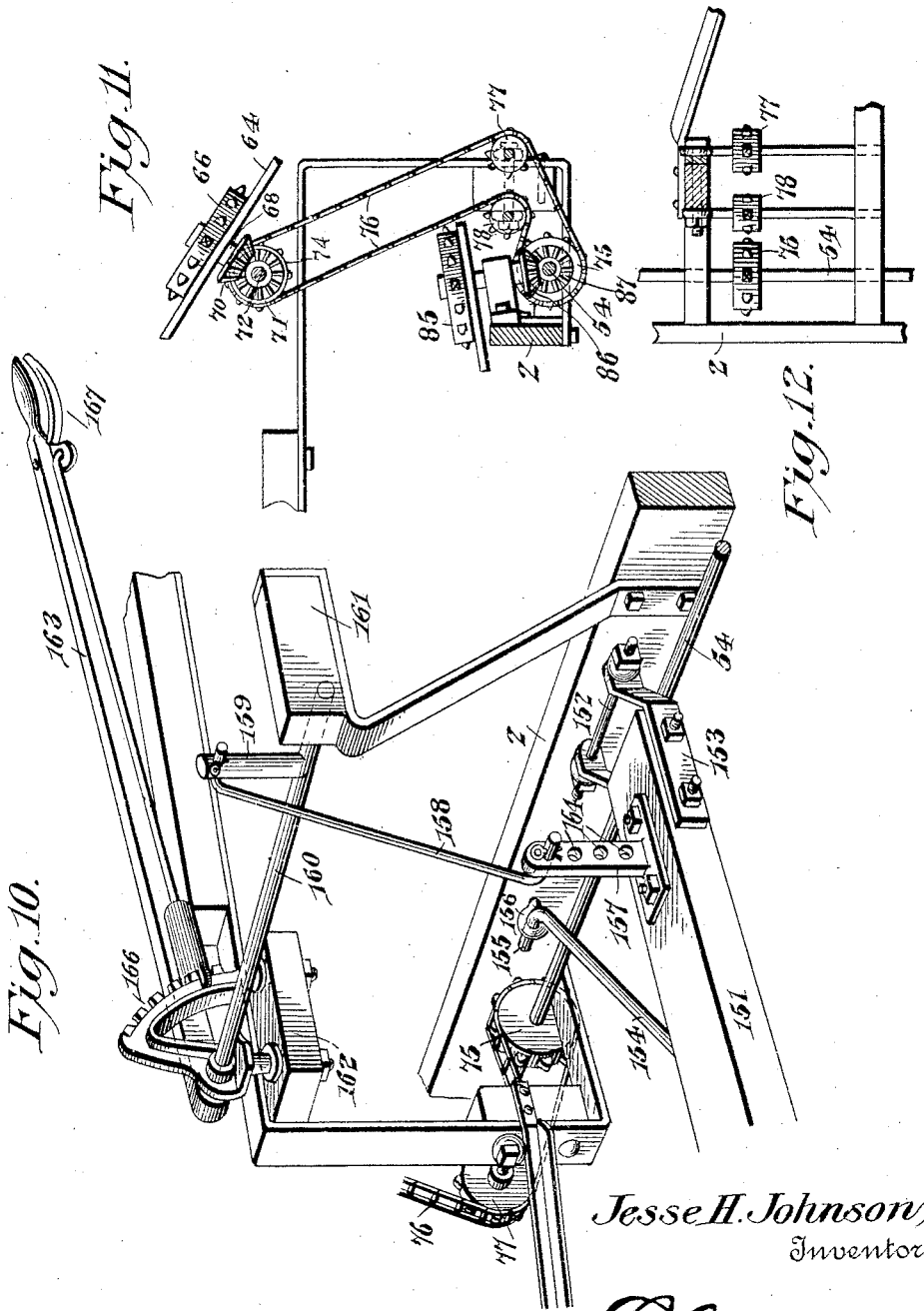

UNITED STATES PATENT OFFICE.

JESSE HAYSE JOHNSON, OF NEW PARIS, OHIO.

CORN-HARVESTING MACHINE.

No. 872,821.　　　　Specification of Letters Patent.　　　　Patented Dec. 3, 1907.

Application filed January 22, 1906. Serial No. 297,296.

*To all whom it may concern:*

Be it known that I, JESSE HAYSE JOHNSON, a citizen of the United States, residing at New Paris, in the county of Preble and State of Ohio, have invented a new and useful Corn-Harvesting Machine, of which the following is a specification.

The invention relates to improvements in corn harvesters.

The object of the present invention is to improve the construction of corn harvesters, and to provide a simple and efficient machine designed for shucking the corn in the field, and adapted to operate on a row of standing corn, and capable of cutting the same and of snapping the ears from the stalks, and of removing the husks from the ears, and finally delivering the latter to a wagon driven at the side of the machine.

A further object of the invention is to provide a corn harvester of this character having combined snapping and husking rolls, provided with spaced stalk receiving front portions to snap the ears from the stalks, and contiguous rear portions for removing the husks from the ears.

Another object of the invention is to provide means for positively feeding the corn to the combined snapping and husking rolls, and to prevent the machine from becoming clogged, either by the corn entering the machine, by the ears after they have been shucked, or by the husks and stalks.

With these and other objects in view, the invention consists in the construction and novel combination and arrangement of parts, hereinafter fully described, illustrated in the accompanying drawings and pointed out in the claims hereto appended; it being understood that various changes in the form, proportion and minor details of construction may be resorted to without departing from the spirit or sacrificing any of the advantages of the invention.

Figure 1:
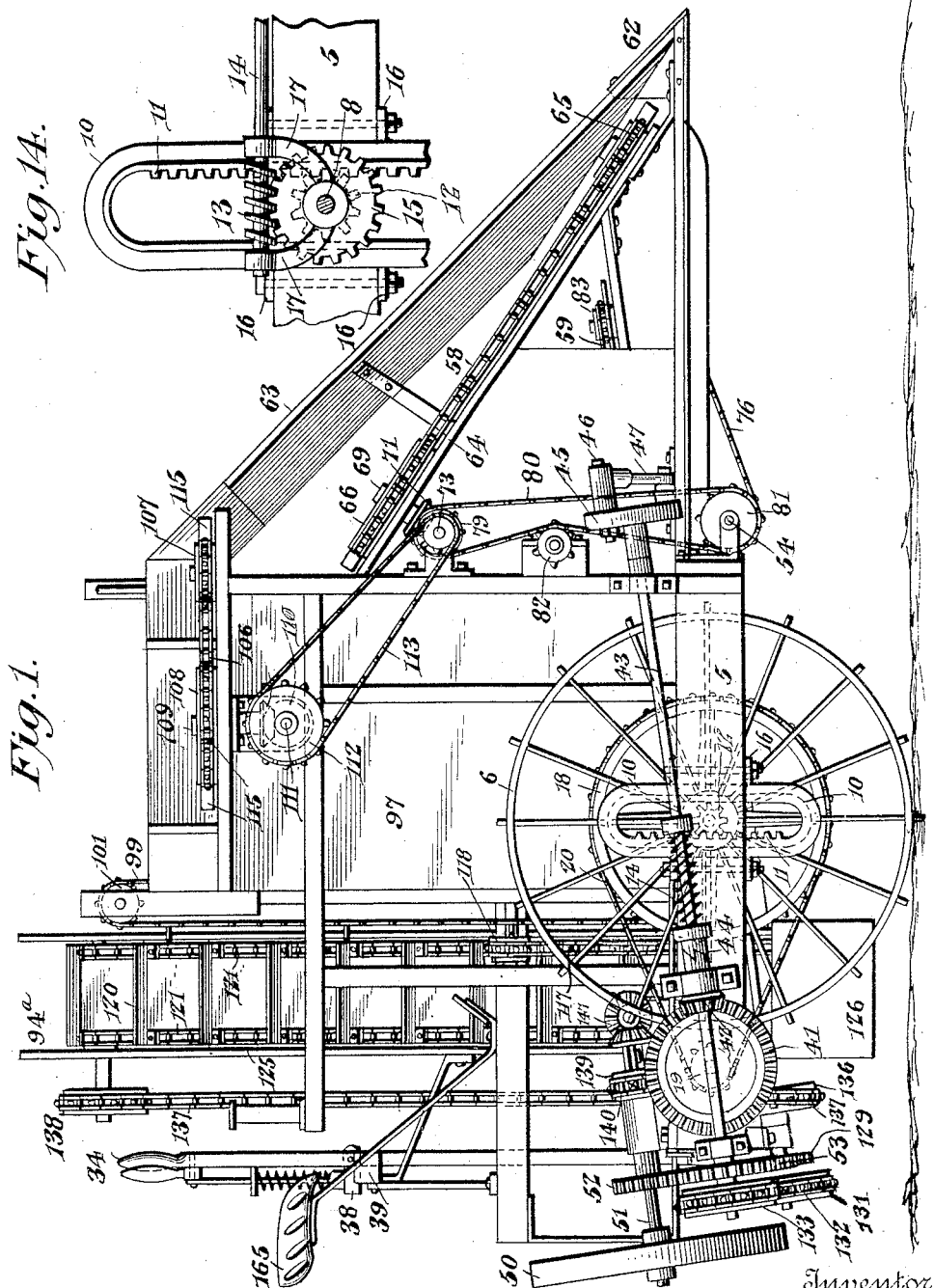
Figure 2:
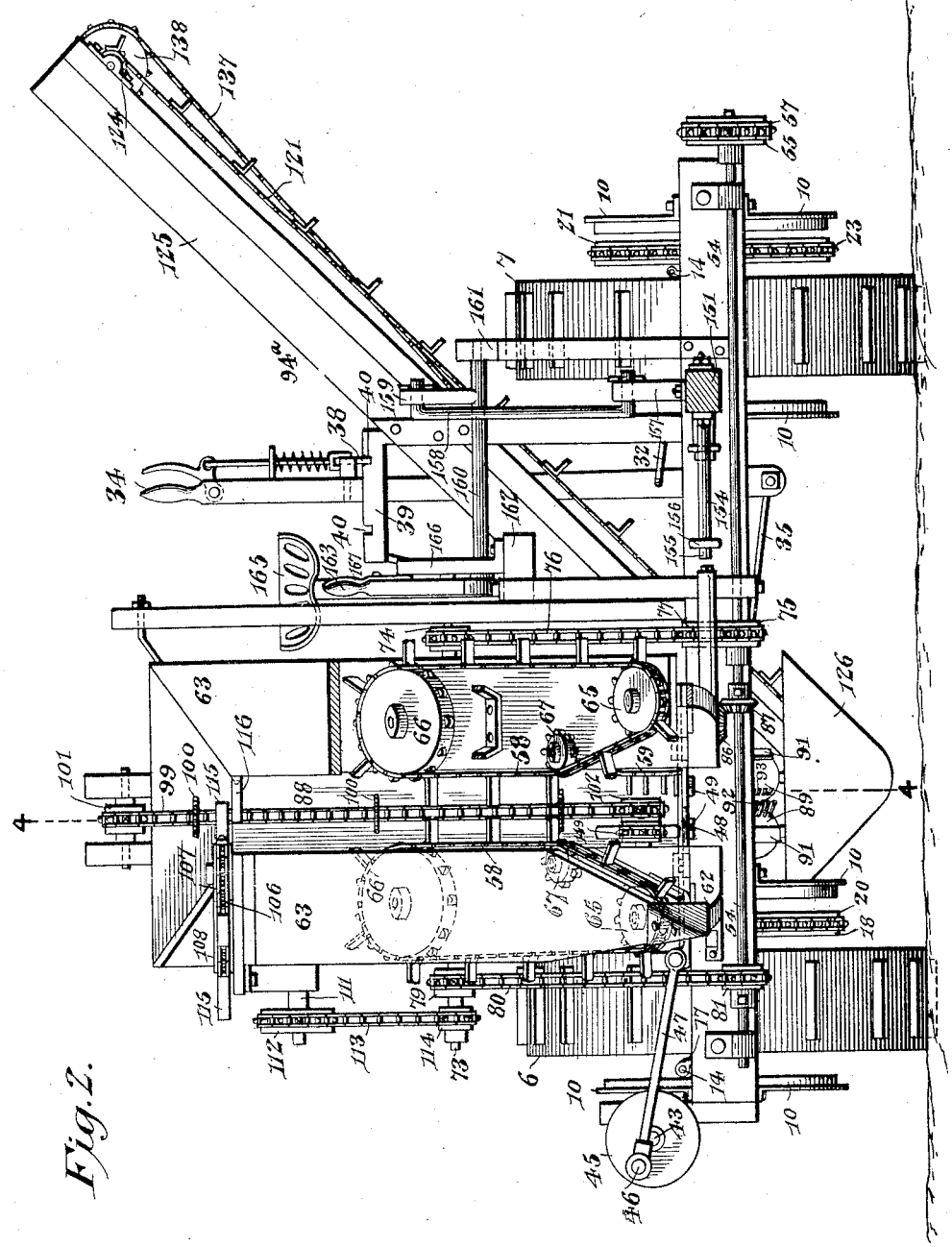

In the drawings: Figure 1 is a side elevation of a corn harvesting machine, constructed in accordance with this invention. Fig. 2 is a front elevation of the same. Fig. 3 is a rear elevation. Fig. 4 is a longitudinal sectional view taken substantially on the line 4—4 of Fig. 2. Fig. 5 is a horizontal sectional view taken approximately on the line 5—5 of Fig. 4. Fig. 6 is a vertical sectional view taken substantially on the line 6—6, Fig. 4. Fig. 7 is a detail horizontal sectional view taken substantially on the line 7—7 of Fig. 4. Fig. 8 is a detail vertical sectional view taken substantially on the line 8—8 of Fig. 4. Fig. 9 is an enlarged detail plan view, partly in section, of the rear portion of the machine, illustrating the arrangement of the snapping rolls and the conveying mechanism. Fig. 10 is a detail perspective view, illustrating the adjusting mechanism for tilting the machine. Fig. 11 is a detail sectional view, illustrating the arrangement of the gearing for communicating motion from the front transverse shaft to the inclined upper endless conveyers for feeding the corn into the machine. Fig. 12 is a detail view illustrating the arrangement of the lower gears shown in Fig. 11. Fig. 13 is an enlarged detail sectional view illustrating the means for adjusting the main or supporting frame. Fig. 14 is a sectional view on the line 14—14 of Fig. 13. Fig. 15 is a detail perspective view of a portion of one of the combined snapping and husking rolls. Fig. 16 is an enlarged transverse sectional view of the snapping portions of the rolls.

Like numerals of reference designate corresponding parts in all the figures of the drawing.

1 designates the main or supporting frame of any preferred construction, and which is preferably rectangular, as clearly illustrated in Fig. 5 of the drawings. The front and rear transverse bars or members 2 and 3 of the frame are connected by longitudinal bars or members 4, which are located at opposite sides of the center of the machine, and which are arranged in spaced relation with the side bars or members 5. The spaces between the intermediate longitudinal bars or members 4 and the sides 5 of the frame, receive carrying wheels 6 and 7, which are provided with broad peripheries to prevent them from sinking into soft soil, and which also have suitable projections or ribs for preventing them from slipping. The carrying wheels are mounted on independent shafts or axles 8 and 8ᵃ, and are connected, by independent sets of sprocket gearing, with a rear transverse main shaft 9, from which motion is communicated to the various parts of the machine, and the said sprocket gearing has suitable clutches as hereinafter explained, whereby the carrying wheels both operate to drive the main transverse shaft 9, when the machine is traveling forward in a straight line, and are prevented from rotating the shaft when either of them is moving backward. Also this construction enables either of the wheels to drive the shaft while the machine is being turned, the outer wheel, when making a turn, traveling faster than the inner wheel and driving the transverse shaft 9.

Each of the axles 8 and 8ª is adjustably connected at each end with the main or supporting frame to enable the machine to be adjusted vertically to position it properly with relation to the corn to be operated on. The adjusting mechanism of each axle comprises a pair of vertical yokes 10 of elliptical form, provided at one side of the axle with racks 11 with which mesh pinions 12, rigidly mounted on the axle. A worm 13, which is mounted on an operating shaft 14, meshes with a gear 15, which is rigid with the pinion 12, and which also turns with the axle. The yoke is provided at opposite sides with projecting ears or flanges 16, which are bolted or otherwise secured to the main or supporting frame, and the operating shaft 14 is journaled in a substantially U-shaped bracket 17, provided at its ends with bearings and arranged in substantially a vertical position. The lower bearing of the bracket 17 receives the axle, and the operating shaft passes through the upper bearings. The operating shaft, which is provided at its outer end with a crank, or other suitable means for rotating it, is journaled in suitable bearings of the main or supporting frame. The operating devices at the ends of the opposite shafts or axles 8 and 8ª are independently adjustable, so that the machine may be readily raised and lowered to set it properly with relation to the character of the land on which the corn is standing. The worm 13, which meshes with the gear 15, forms a lock for holding the gear 15 and the pinion 12 against rotary movement, and it will be clear that, when the pinion is rotated, it will cause the yoke to move either upward or downward, and thereby raise or lower the frame of the machine. As the pinion 12 and the gear 15 are fixed to the shaft or axle, and the carrying wheels with their sprockets are loose on the same, the rotation of the wheels will not affect the adjustment, or alter the position of the main or supporting frame.

The sprocket gearing, for connecting the right-hand carrying wheel 6 with the rear transverse shaft 9, is located at the inner side of the said wheel 6, and it consists of a large sprocket wheel 18, keyed or otherwise secured to the wheels of the shaft or axle 8, and a sprocket pinion 19, rotatably mounted on the transverse shaft 9, and a sprocket chain 20, which is arranged on and meshes with the sprocket gears 18 and 19. The sprocket gearing, for connecting the left-hand carrying wheel 7 with the main transverse shaft 9, is located at the outer side of the former, and comprises a large sprocket wheel 21, a small sprocket pinion 22 and a sprocket chain 23. The sprocket wheel is fixed to the wheel of the shaft or axle 8ª; the pinion 22 is mounted on the main transverse shaft 9, and the sprocket chain 23 connects the gears 20 and 22.

The small pinions 19 and 22 of the said sprocket gearing are provided with clutch members 24 and 25, which are engaged by slidable clutch members 26 and 27, adapted to be moved into and out of engagement with the clutch members 24 and 25 to throw the machine into and out of operation. The clutch members 24 and 25, consist of hub extensions, provided with clutch faces, and the slidable clutch members are held against rotary movement on the rear shaft 9 by means of a key and groove or the like, and they are maintained in engagement with the clutch sections of the sprocket pinions by means of coiled springs 28, disposed on the shaft 9 and interposed between the slidable clutch sections and the adjustable collars 29. The adjustable collars 29 are provided with clamping screws, and are adapted to be adjusted to vary the tension of the coiled springs 28. The slidable clutch sections are also provided with annular grooves, and are engaged by forks 30 and 31 of a rod 32 and a short lever 33. The rod 32 is substantially L-shaped, and extends inwardly from the slidable clutch section 27, its inner end being connected with a shifting lever 34. The short lever 33, which is disposed longitudinally of the machine, is fulcrumed between its ends on a bracket, or other suitable support, and it is connected with the shifting lever by a transversely disposed connecting rod 35. The rod 35 is disposed transversely of the machine, and the shifting lever, which is fulcrumed near its lower end, is connected with the rods 32 and 35 above and below the pivot 37. The shifting lever, which is adapted to be oscillated to throw the machine into and out of operation, is provided with a spring actuated detent 38, adapted to engage a suitable ratchet 39, preferably consisting of a horizontal bar or member, supported by suitable bars or braces and provided with opposite notches 40, as clearly shown in Fig. 3 of the drawings. When the shifting lever is operated, the slidable clutch sections are simultaneously moved in the same direction.

The rear transverse shaft 9, which extends entirely across the frame 1 of the machine, is provided at its right-hand end with a bevel gear 41, which meshes with a bevel pinion 42 of a longitudinal shaft 43, located at the right-hand side of the machine and arranged at a slight inclination as clearly illustrated in Fig. 1 of the drawing. The bevel pinion 42 is connected with the shaft 43 by a clutch 44, having a slidable spring actuated member, and adapted to be operated by any suitable means for throwing the inclined longitudinal shaft into and out of operation. The front end of the shaft 43, which extends upwardly and forwardly from the main supporting frame, is provided with a crank element, preferably consisting of a crank disk 45, having an eccentrically arranged wrist pin 46, which is connected to the outer end of a transversely disposed pitman rod 47. The inner end of the pitman rod is connected to one end of a transversely disposed reciprocatable knife 48, having a centrally arranged substantially triangular cutting portion or plate, which operates in connection with a pair of fixed members 49. The fixed members 49, which are tapered as clearly shown in Fig. 5, extend outwardly or from the front of the main or supporting frame, and they are spaced apart and have an inwardly tapered space or passage between them to receive the stalks of corn, whereby the latter are properly held, while they are being severed by the reciprocating knife. The knife, which is rapidly reciprocated, has opposite cutting portions, and is capable of effectively cutting the stalks of corn as the machine travels along a row. In order to prevent the machine from being affected by the jar and vibrations incident to cutting the corn, a balance or fly wheel 50 is provided, and the said wheel 50 is mounted on a short counter-shaft 51, journaled in suitable bearings at the rear of the main or supporting frame, and connected by spur gears 52 and 53 with the longitudinal side shaft 43.

The rear transverse shaft 9 is connected at the left hand side of the machine with a front transverse shaft 54 by sprocket gearing, consisting of front and rear sprocket wheels 55 and 56, and a sprocket chain 57, as clearly shown in Fig. 5 of the drawings. The front transverse shaft 54, which is journaled in on suitable bearings at the front of the frame, extends across the same, and motion is communicated therefrom to a pair of upper endless chains 58, and a lower endless chain 59, located at the front of the machine, at the sides of a longitudinal passageway 60 for the corn, and provided at intervals with suitable lugs or fingers, whereby they are adapted to engage the corn and positively feed the same into the machine to the cutting mechanism. The passageway 60 between spaced tapering guides 61 and 62, has a flaring mouth or entrance, and a contracted rear corn-receiving portion, as clearly shown in Fig. 5 of the drawing. The guides 61 and 62 are each provided with inclined boards or members 63 and 64, extending downwardly and forwardly from the front of the machine, and having an intervening space to receive the upper endless chain 58 of the feed mechanism. The inclined boards or members 63 and 64, are suitably connected at their front ends, and are supported by suitable bars or braces, but the spaced guides 61 and 62, which travel at opposite sides of a row of corn, may be constructed in any desired manner as will be readily understood. The upper endless feed chains 58 are arranged on front and rear sprocket wheels 65 and 66, and their inner sides or stretches are guided by idlers 67, arranged as clearly shown in Fig. 2 of the drawings. The shafts 68 and 69 of the upper sprocket wheels are extended through the lower inclined boards or bars 64, and are connected by bevel gearing 70 and 71 with short transverse shafts 72 and 73, located at opposite sides of the longitudinal passage for the corn, and connected by sprocket gearing with the front transverse shaft 54. The sprocket gearing at the left-hand side of the machine for connecting the shaft 72 with the said front shaft 54, consists of upper and lower sprocket wheels 74 and 75, and a sprocket chain 76, which is also arranged on idlers 77 and 78. The short transverse shaft 73 at the right-hand side of the machine is provided with a sprocket wheel 79, which is connected by a sprocket chain 80 with a sprocket wheel 81 of the front transverse shaft, an idler 82 being arranged to receive the rear side or stretch of the sprocket chain 80.

The lower endless chain 59, which feeds the bottoms of the stalks inward or rearward, extends inwardly beyond the cutting mechanism, and is arranged on front and rear sprocket pinions 83 and 84, and is actuated by an intermediate sprocket wheel 85, which is located above the front transverse shaft and which is connected with the same by means of bevel gears 86 and 87. The intermediate sprocket wheel 85 is mounted on the upper end of the short shaft, and the bevel gear 86 is fixed to the lower end of the same, and meshes with the bevel gear 87, which is mounted on the front transverse shaft 54, as clearly illustrated in Fig. 11 of the drawings. The machine is provided at its central portion with a longitudinal guideway or chamber 88, forming a continuation of the passageway 60 and composed of opposite vertical sides and a connecting vertical rear wall, and having a flaring hopper-like top. The guideway 88 is framed around, and it forms a corn-receiving chamber or compartment, which is open at the front and top, and at the bottom of which is arranged a pair of combined snapping and husking rolls 89. It receives the severed corn while the stalks are in an upright position, and the stalks are fed downwardly between the front portions of the rolls. These rolls are adapted to snap the ears from the stalks as the latter pass downwardly between the front portions of the rolls, and the said rolls then remove the husks from the ears. They are provided with reduced spaced front portions 90, the space being of a size to permit the stalks of the corn to pass downward readily between the rolls, which grip the stalks and form a positive feed, and the reduction of the front portions of the rolls forming shoulders at the rear end of the intervening space between them. In order to facilitate the downward passage of the stalks between the rolls, the reduced front portions are provided at intervals with knives 91, operating in the space between the reduced portions of the rolls and having projecting bevel cutting edges for engaging and cutting the stalks into small lengths, whereby the rolls are effectively prevented from becoming clogged by long stalks. The knives 91, which are straight, have their inner flat faces fitted against the front snapping portions of the rolls. The feeding of the stalks through the front portions of the rolls is also rendered positive by means of projections or pins 92, extending from the rolls, as shown, which are also provided with notches or recesses 93, in which the pins are received as they pass downward at the inner sides of the rolls. Any number of these interfitting pins and recesses may be employed, and by having the rolls interfit or mesh in this manner, a positive feed of the stalks through the rolls is effected. The pins or teeth also extend the entire length of the rolls, and positively carry the husks downward through the rear husking portions of the rolls.

The combined snapping and husking rolls are inclined, and extend downward and rearward, and the ears, as they are snapped from the stalks, move downward and rearward along the rolls to the rear husking portions, which are of greater diameter than the reduced front portions. The large rear portions of the husking rolls are contiguous to each other, and are adapted to grip the husks, and thereby remove the same from the ears, which are carried from the husking rolls by endless chain conveyers 103 and 117, as hereinafter more fully explained. The fly wheel 50 renders the operation of the rolls positive uniform, and continuous, as the wheels would slide if the power from the fly wheel did not continue the motion of the rolls.

The lower endless feed chain 59 extends inward or rearward to the inner ends of the reduced snapping portions of the rolls 89, so that the stalks of corn are positively carried along the front portions of the rolls, and are caused to be engaged by the same. The chain 59 causes a positive inward feed of the lower portions of the stalks, and thereby prevents the machine from being clogged, as the stalks are distributed over the spaced front portions 90 of the rolls, and are caused to pass downward between the same, and drop beneath the machine. The stalks are also fed downward by an endless carrier 94, consisting of an endless belt of canvas, or other suitable material, arranged on upper and lower rolls 95 and 96, and provided at intervals with transverse slats, which are adapted to carry the corn downward to the rolls 89. The endless carrier, which is located above the rolls 89, is substantially vertical, and constitutes a portion of the left-hand side of the corn-receiving chamber or guideway 88. The corn-receiving chamber or guideway is provided at the right-hand side with a smooth continuous wall 97, which is connected at the back with the framework of the opposite side of the corn receiving chamber or guideway by the rear wall 98, at which is located an endless chain conveyer 99, having projecting fingers or tines 100, arranged in sets or series, which extend transversely of the corn receiving space or passage, and which may be of any desired number. The inner or front stretch or side of the rear endless chain conveyer moves downwardly within the corn receiving space or chamber, and positively carries the corn downward to the combined snapping and husking rolls. The rear vertical endless conveyer or carrier is mounted on upper and lower sprocket pinions 101 and 102, which are operated as hereinafter explained to move the front side or stretch downward. The inner side of the endless carrier or conveyer 94 is also moved downward by the means hereinafter explained.

The snapped ears are carried rearwardly along the combined snapping and husking rolls by means of a horizontal endless chain conveyer 103, having upper and lower sides or stretches, provided with projecting fingers or lugs and arranged on front and rear sprocket pinions 104 and 105. The lugs or fingers of the lower stretch or side of the bottom longitudinal conveyer 103 extend downward from the chain, and are spaced from the rolls 89, and adapted to feed the ears rearward from the front snapping portions 90 of the rolls to the rear husking portions of the same.

The tops of the stalks of corn are fed rearwardly, about one-half as fast as the lower portions, by means of a top horizontal endless chain conveyer 106, located at the right-hand side of the corn receiving chamber or guideway, and consisting of an endless chain, provided at intervals with projecting fingers or lugs, and arranged on a front horizontal sprocket pinion 107 and a horizontal rear sprocket wheel 108, as clearly shown in Fig. 7 of the drawings. The rear sprocket wheel 108 is mounted on the upper end of a short substantially vertical shaft $109^a$, which is connected at its lower end, by bevel gearing 110, with the inner end of a short transversely disposed shaft 111. The outer end of the transverse shaft 111 carries a sprocket wheel 112, which is connected, by a sprocket chain 113, with a sprocket pinion 114, that is keyed or otherwise secured to the outer end of the short transverse shaft 73. The fingers or lugs 115, which move rearward at the top of the corn receiving chamber or guideway, are preferably curved as shown, and coöperate with a pair of resilient fingers 116, arranged at an angle, and secured to the upper portion of the left-hand side of the corn receiving chamber or guideway, as clearly shown in Fig. 7. These angularly disposed fingers 116 are adapted to direct the corn toward the conveyer 106, and prevent the corn from passing the conveyer without being operated thereon by the same, and thereby render the rearward feed of the tops of the stalks positive. The upper and lower feeding mechanism at the top and bottom of the corn-receiving chamber or guideway maintain the stalks in substantially an upright position, and facilitate their downward passage between the rolls in addition to their function of feeding the corn rearward.

The endless chain conveyer 103, which extends through the outlet of the rear wall of the corn receiving chamber or guide-way, is adapted to carry the husked ears rearwardly along the portions 90 of the rolls 89 and through the outlet of the rear wall of the said guide-way or chamber. The husked ears are then carried off to the rear ends of the rolls 89 onto the conveyer 94$^a$ by means of a short endless chain conveyer 117, arranged at an inclination and working transversely of the rear ends of the rolls, as clearly illustrated in Fig. 8 of the drawings. The short endless chain conveyer 117 consists of a chain provided with projecting fingers or lugs, and arranged on upper and lower sprocket pinions 118 and 119. The lower pinion or gear 119 is located above the rolls, and the fingers or lugs, passing around the lower gear 119, deliver the ears from the rolls onto the elevator. The corn-receiving chamber or guideway is provided at the back with a bottom outlet for the husked ears, and the longitudinal conveyer 103 extends through the outlet to a point above the lower portion of the elevator 94$^a$. The elevator 94$^a$ consists of an endless belt or apron of canvas, provided at suitable intervals with transverse slats 120, and having endless chains 121 at opposite sides. The endless belt or apron is arranged on upper and lower rolls 122 and 123, provided with opposite sets of sprocket teeth 124 to mesh with the chains.

The upper and lower rolls are journaled in suitable bearings of the frame 125 of the elevator, which may be of any desired length for discharging the ears of corn into a wagon driven at the left-hand side of the machine. The elevator is provided at the bottom with a hopper or tapered casing 126, which is open at the top, located beneath the rear ends of the rolls and arranged to receive the ears falling from the same. The hopper or casing is rounded at the bottom, and the outer side is arranged in parallelism with the belt of the elevator, as clearly shown in Fig. 8, and the endless belt or carrier, which extends into the hopper or casing 126, is adapted to carry the ears upward, as will be readily understood.

The combined snapping and husking rolls are journaled at their front ends in suitable bearings at the front of the machine, and they are provided at their rear ends with shafts 127 and 128, which may be secured to the rolls 89 in any desired manner. These shafts 127 and 128 are connected by spur gears 129 and 130, which cause the rolls to rotate in unison, and in the proper direction to cause the stalks and husks to be fed downward between them. The inner contiguous portions of the rolls move downward, and grip the stalks and the husks, and carry the same down with them. The shaft 127 is extended rearward beyond the shaft 128, and it has a sprocket wheel 131, keyed or otherwise secured to its rear portion. The sprocket wheel 131 is connected by a sprocket chain 132 with a sprocket wheel 133, which is mounted on the side shaft 43 at the rear end thereof. The sprocket chain 132 extends transversely of the machine at the back thereof, and its upper stretch or side is engaged by an idler 124, mounted on a bracket or bar 135, as clearly shown in Fig. 3 of the drawings. Motion is communicated from the side shaft 43 to the snapping and husking rolls through the rear transverse sprocket gearing. The shaft 127 is also provided with a sprocket wheel 136, which receives a sprocket chain 137, and extends to a sprocket wheel 138 of the upper roll of the elevator 94$^a$. By this arrangement of gearing motion is communicated from the shaft 127 to the elevator.

The short counter shaft 51, on which the balance or fly wheel is mounted, is provided at its front end with a sprocket pinion 139, and is connected by a sprocket chain 140 with a short longitudinal shaft 141, which is provided at its rear end with a sprocket wheel 142 to receive the said chain 140. The front end of the shaft 141 carries the lower sprocket gear 119, on which the endless chain conveyer 117 is arranged, and the latter is operated through this gearing. The upper side or stretch of the chain 140 passes over a sprocket wheel 143, and under a small idler 144, and the lower stretch or side of the chain passes over a guide 145. The chain, however, may be arranged in any other desired manner to cause a positive rotation of the intermediate sprocket gear 143. The short shaft 146, which extends longitudinally of the machine is supported at an intermediate point by a bearing bracket, and it is connected at its front end by a bevel gearing 147 with the outer end of a short transverse shaft 148. The shaft 148, which is journaled in suitable bearings of the frame of the machine, carries the rear sprocket wheel 105 of the longitudinal chain conveyer 103 and is also connected by a sprocket gearing 149 with a lower shaft 150, on which is mounted the lower sprocket 102 of the vertical chain conveyer. The sprocket gearing 149 consists of sprocket wheels, mounted respectively on the shafts 148 and 150, and a sprocket chain arranged on and meshing with the sprocket wheels. The machine is provided at its front with a draft-beam or tongue 151, which is hinged at its rear end to the front bar or member of the frame by means of the rod or bolt 152, extending through the projections or ears of the frame of the machine, and through the rearward extensions of plates 153, and the ends of the coupling bolt 152 are threaded for the reception of nuts. The tongue is also connected at the inner side with the central portion of the front bar or member by a rod or brace 154, which assists in centering the draft, and prevents side draft. The rod or brace 154 is secured at its front end to the tongue or beam by bolts or other suitable fastening devices, and its rear end 155 is bent at an angle, and is arranged in an eye 156 of the front bar or member of the frame of the machine.

At a point in advance of the coupling, the tongue or draft beam is provided with an upwardly extending arm 157, which is connected by a rod 158 with an arm 159 of a superimposed rock-shaft 160. The rock-shaft is journaled in suitable bearings or supports 161 and 162, and it has an operating handle 163, adapted to be oscillated for partially rotating the rock-shaft for adjusting the relative positions of the frame of the machine and the tongue, and thereby tilting the machine on the shafts or axles 8 and 8$^a$. The arm 157 is provided at intervals with perforations 164, and it has an attachment plate, which is bolted to the upper face of the tongue. The perforations 164 are arranged at intervals, and are adapted to receive the connecting rod 158, which has its lower end bent at an angle and passed through the arm 157. The lower end of the connecting rod is secured to the arm by means of a key, or other suitable fastening device, and the upper end of the connecting rod, which is bent at an angle, and passed through a perforation of the arm 159, is similarly secured to the same. The operating arm or lever 163, which extends rearward a sufficient distance to enable it to be conveniently operated without leaving the seat 165, is provided with a spring actuated detent, which is adapted to engage a toothed segment 166. The spring actuated detent is operated by a latch lever 167, located adjacent to the handle or grip of the operating arm or lever.

Having thus described my invention what I claim and desire to secure by Letters Patent is:

1. A corn harvesting machine provided with a corn receiving chamber or guide-way, composed of vertical side and rear walls, said chamber being open at the front and adapted to receive the severed corn while the stalks are in an upright position, means arranged at the bottom of the chamber or guide-way for stripping the ears from the stalks, and cutting mechanism arranged at the front of the chamber or guide-way.

2. A corn harvesting machine provided with a corn receiving chamber or guide-way arranged to receive the severed stalks in an upright position and having side and rear walls, means for feeding the stalks rearwardly in substantially an upright position means located at the bottom of the chamber or guide-way for stripping the ears from the stalks, cutting mechanism located at the front of the chamber or guide-way, and feeding mechanism projecting in advance of the cutting mechanism and extending rearwardly therefrom into the chamber or guide-way.

3. A corn harvesting machine having cutting mechanism for severing the stalks from the ground and provided with a corn-receiving chamber or guide-way located in rear of the cutting mechanism and arranged to receive the stalks in substantially an upright position, means arranged at the bottom of the chamber or guide-way for stripping the ears from the stalks, and conveyer mechanism located above and moving downwardly toward the stripping means to carry the corn downwardly to the same.

4. A corn harvesting machine provided with a corn-receiving chamber or guideway, rolls located at the bottom of the chamber or guideway, and an upright conveyer operating within the chamber or guideway for carrying the corn downward to the rolls.

5. A corn harvesting machine provided with a chamber or guideway, rolls arranged at the bottom thereof, and an endless conveyer having a stretch or portion operating within the chamber or guideway and moving downwardly therein to carry corn to the rolls.

6. A corn harvesting machine provided with a corn receiving chamber or guideway open at the front, rolls located at the bottom of the chamber or guideway, and an endless conveyer forming one of the side walls of the chamber or guideway and having its inner portion movable downwardly for carrying the corn to the rolls.

7. A corn harvesting machine provided with cutting mechanism and having a chamber or guideway located in rear of the cutting mechanism and arranged to receive the severed corn while the stalks are substantially in an upright position, said chamber or guideway being provided with side and rear walls, means for stripping the ears from the stalks located at the bottom of the chamber or guideway and forming a bottom therefor, and conveyers arranged at the top and bottom of the chamber or guideway for simultaneously feeding the upper and lower ends of the stalks rearwardly while in an upright position.

8. A corn harvesting machine provided with a corn-receiving chamber or guideway, rolls arranged at the bottom of the same, and upper and lower longitudinal conveyers for feeding the corn rearward in the chamber or guideway, said conveyers traveling at different speeds.

9. A corn harvesting machine provided with a corn receiving chamber or guideway, rolls arranged at the bottom of the same, and upper and lower longitudinal conveyers for feeding the corn rearward in the chamber or guide, the upper conveyer being slower than the lower conveyer.

10. A corn harvesting machine provided with a corn-receiving chamber or guideway, rolls arranged at the bottom thereof, conveying means disposed longitudinally of the guideway or chamber for feeding the corn inwardly, and conveying means also operating within the chamber or guideway for moving the corn downwardly.

11. A corn harvesting machine having a chamber or guideway, rolls located at the bottom thereof, conveying means extending longitudinally of the chamber or guideway for feeding the corn inwardly, and an upright endless conveyer arranged at the back of the chamber or guideway and having a downwardly moving portion located within the same, said conveyer being provided with means for engaging the corn.

12. A corn harvesting machine having a chamber or guideway, rolls located at the bottom thereof, conveying means extending longitudinally of the chamber or guideway for feeding the corn inwardly, and an upright endless conveyer arranged at the back of the chamber or guideway and having a downwardly moving portion located within the same, said conveyer being provided with corn engaging fingers arranged in sets or series.

13. A corn harvesting machine having a chamber or guideway, rolls located at the bottom thereof, conveying means extending longitudinally of the chamber or guideway for feeding the corn inwardly, and an upright endless conveyer arranged at the back of the chamber or guideway and having a downwardly moving portion located within the same, said conveyer being provided with corn engaging fingers arranged in sets or series, disposed transversely of the chamber or guideway.

14. A corn harvesting machine provided with a corn-receiving chamber or guideway open at the front and closed at the sides and back, rolls located at the bottom of the chamber or guideway, upper and lower conveying means extending longitudinally of the chamber or guideway to feed the corn inwardly, an upright side conveyer constituting a portion of one of the side walls of the chamber or guideway and having a downwardly moving portion to carry the corn downward, and an upright conveyer located at the back of the chamber or guideway and having an downwardly moving portion operating within the same.

15. A corn harvesting machine provided with cutting mechanism and having a corn receiving chamber located in rear of the cutting mechanism and provided with side and rear walls and open at the front, rolls located at the bottom of the chamber, an endless conveyer extending longitudinally of the chamber at one side of the same, and means located at the opposite side of the chamber for guiding the corn to the conveyer.

16. A corn harvesting machine provided with cutting mechanism and having a corn receiving chamber located in rear of the cutting mechanism and provided with side and rear walls, rolls located at the bottom of the chamber, an endless conveyer extending longitudinally of the chamber at the top thereof and located at one side of the same, and a guide-finger extending from the opposite side of the chamber for directing the corn to the conveyer.

17. A corn harvesting machine provided with cutting mechanism and having a chamber or guide-way arranged to receive the severed stalks in an upright position, means for stripping the ears from the stalks, and conveying means extending downward from the upper portion of the chamber or guideway to the lower portion thereof for carrying the corn downward to the stripping means.

18. A corn harvesting machine having a chamber or guide-way provided with side and rear walls and open at the front, said chamber or guide-way being arranged to receive the stalks in an upright position, means located at the bottom of the chamber or guide-way for stripping the ears from the stalks, and conveying means arranged at the side and back of the chamber or guide-way and extending downwardly from the upper portion of the said chamber to the lower portion thereof to convey the corn to the stripping means.

19. A corn harvesting machine having a corn-receiving chamber or guideway, combined snapping and husking rolls forming the bottom of the chamber or guideway, longitudinal conveyers for moving the corn inwardly along the chamber or guideway, upright conveyers having downwardly movable portions operating within the chamber or guideway to carry the corn downward, and a conveyer disposed longitudinally of the rolls to carry the snapped ears from the front snapping portions of the rolls to the rear husking portions of the same.

20. A corn harvesting machine provided with a corn-receiving chamber or guideway having side and rear walls and open at the front, rolls located at the bottom thereof, guiding mechanism arranged at the front of the chamber or guideway, upper conveyers extending downwardly and forwardly in advance of the cutting mechanism at opposite sides of the entrance to the chamber or guideway, and a lower conveyer located above the cutting mechanism and extending in advance and in rear of the same at one side of the chamber or guideway.

21. A corn harvesting machine having a chamber or guideway, combined snapping and husking rolls located at the bottom of the same, cutting mechanism arranged at the front of the chamber or guideway, upper and lower means extending in advance of the cutting mechanism for feeding the corn inwardly to the same, conveying means operating within the chamber or guideway for moving the cut corn both inwardly and downwardly to the rolls, and separate conveying means for carrying the snapped ears rearwardly to the husking portions of the rolls.

22. A corn harvesting machine provided with a chamber or guide-way having side and rear walls and provided at the back with an outlet, means located at the bottom of the chamber or guide-way for stripping the ears from the stalks, said means forming a bottom for the chamber or guide-way and extending through the rear outlet, and a conveyer disposed longitudinally of the chamber or guide-way and also extending through the outlet for carrying the ears through the same.

23. A corn harvesting machine provided with a corn receiving chamber or guide-way having side and rear walls and provided at the back with an outlet, means located at the bottom of the chamber or guide-way for stripping the ears from the stalks, conveying means moving downwardly from the upper portion of the chamber or guide-way to the lower portion thereof, and separate conveying means extending through the outlet for carrying the ears through the same.

24. A corn harvesting machine having a corn receiving chamber or guide-way provided with side and rear walls and having an outlet at the back, an elevator located in rear of the chamber or guide-way, means located at the bottom of the chamber or guideway for stripping the ears from the stalks, conveying means extending downwardly within the chamber or guide-way from the upper portion thereof for carrying the corn to the stripping means, and a longitudinal conveyer operating within the chamber or guide-way and extending through the outlet thereof and for carrying the ears to the elevator.

25. A corn harvesting machine provided with a chamber or guide-way having side and rear walls and provided at the back with an outlet, an elevator located in rear of the chamber or guide-way, stripping mechanism arranged at the bottom of the latter and extending through the said outlet, a longitudinal conveyer operating within the chamber or guide-way and extending through the outlet to a point in rear of the chamber or guide-way, and a conveyer arranged in rear of the chamber or guide-way and located above the stripping mechanism and working transversely of the same, the latter conveyer being also disposed longitudinally of the elevator at a point above the lower end thereof.

26. In a machine of the class described, the combination of a frame, independently adjustable shafts or axles located at opposite sides of the frame, carrying wheels mounted on the shafts or axles, a main shaft extending across the machine, gearing for connecting each of the said wheels with the main shaft, cutting mechanism, snapping and husking means, and means for operatively connecting the main shaft with the cutting mechanism and with the snapping and husking means.

27. In a machine of the class described, the combination of a frame, independently adjustable carrying wheels arranged at opposite sides, a rear and transverse shaft mounted on the frame, gearing connecting the carrying wheels with the rear shaft, cutting mechanism, gearing located at one side of the machine for connecting the cutting mechanism with the rear transverse shaft, a front transverse shaft connected at the opposite side of the frame with the rear shaft, feeding mechanism connected with and operated by the front shaft, and means for stripping the ears from the stalks.

28. In a machine of the class described, the combination of a frame, independently adjustable carrying wheels, a rear transverse shaft extending across the frame, gearing for connecting the shaft with the carrying wheels, cutting mechanism, a longitudinal shaft located at one side of the frame and connected at its front end with the cutting mechanism and at the rear with the transverse shaft, a front transverse shaft also operated by the rear transverse shaft, means operated by the front transverse shaft for feeding the corn to the cutting mechanism, and means for stripping the ears from the stalks.

29. In a machine of the class described, the combination of a frame independently adjustable carrying wheels located at opposite sides of the frame, a transverse shaft extending across the frame, two sets of gearing for connecting the carrying wheels with the transverse shaft, said gearing being provided with clutch mechanism, cutting mechanism arranged at the front of the frame, a longitudinal shaft connected at the front with the cutting mechanism, gearing for connecting the transverse shaft with the longitudinal shaft, and means for stripping the ears from the stalks.

30. In a machine of the class described, the combination of a frame, independently adjustable carrying wheels, rolls, shafts extending from the rolls, gearing connecting the shafts, cutting mechanism located at the front of the rolls, a longitudinal shaft connected at the front with the cutting mechanism, gearing connecting the rear portion of the longitudinal shaft with the independently adjustable carrying wheels, and separate gearing connecting the longitudinal shaft with the shaft of one of the rolls, said gearing embodying a counter-shaft and a fly-wheel mounted thereon.

31. A corn harvesting machine provided with combined snapping and husking rolls consisting of contiguous rear husking portions and spaced front snapping portions, and straight knives having their inner flat faces fitted against the snapping portions of the rolls, said knives being arranged to pass through the space between the said snapping portions for cutting the stalks.

32. A corn harvesting machine provided with combined snapping and husking rolls consisting of contiguous rear husking portions and spaced front snapping portions, the latter being provided with matching or interfitting projections and recesses arranged in rows, and knives located between the rows of projections and recesses.

33. A corn harvesting machine provided with combined snapping and husking rolls having spaced front snapping portions provided with interfitting or matching projections and recesses, and knives also carried by the snapping portions of the rolls.

34. A corn harvesting machine provided with combined snapping and husking rolls having spaced front snapping portions provided with longitudinal rows of interfitting or matching projecting pins and recesses, the pins being of a length to extend across the space between the rolls and into the said recesses, and straight longitudinal knives mounted on the spaced portions of the rolls and arranged between the rows of pins and recesses.

35. A corn harvester provided with a corn receiving chamber or guide-way having an outlet at the back, combined snapping and husking rolls having spaced front snapping portions and provided with rear contiguous husking portions, a conveyer located at one side of the chamber or guide-way and extending into the same from the front thereof to the rear terminals of the snapping portions of the rolls, and a separate conveyer located at the opposite side of the chamber or guide-way and extending from the front thereof through the rear outlet.

36. In a machine of the class described, the combination of a frame, independently adjustable shafts or axles located at opposite sides of the frame, carrying wheels mounted on the shafts or axles, a main shaft extending across the machine, gearing connecting each of the said wheels with the main shaft and provided with clutches, cutting mechanism and snapping and husking means connected with the main shaft, a shifting lever, and means for connecting the shifting lever with the clutches.

37. In a machine of the class described, the combination of a frame, independently adjustable shafts or axles located at opposite sides of the frame, carrying wheels mounted on the shaft or axles, a main shaft extending across the machine, gearing connecting each of the said wheels with the main shaft and provided with clutches, cutting mechanism and snapping and husking means connected with the main shaft, a shifting lever fulcrumed at an intermediate point, a rod located at one side of the pivotal point and connecting the shifting lever with one of the clutches, a longitudinal lever connected with the other clutch, and means for connecting the said levers.

38. A corn harvesting machine provided cutting mechanism, and having a chamber or guide-way located in rear of the cutting mechanism and arranged to receive the severed corn in an upright position, upper and lower feeding means for engaging the stalks at the top and bottom thereof, separate feeding means for moving the stalks downwardly within the chamber or guide-way, and means for stripping the ears from the stalks.

In testimony, that I claim the foregoing as my own, I have hereto affixed my signature in the presence of two witnesses.

JESSE HAYSE JOHNSON.

Witnesses:
ELMER E. MCKEE,
WILLIAM BARNETT.